July 20, 1926.

H. T. CRITCHLOW

FLOW METER

Filed March 5, 1921

1,593,291

3 Sheets-Sheet 1

WITNESSES
J. Herbert Bradley.

INVENTOR
Howard T. Critchlow
by Winter & Brown,
his attorneys

July 20, 1926.

H. T. CRITCHLOW

FLOW METER

Filed March 5, 1921

1,593,291

3 Sheets-Sheet 2

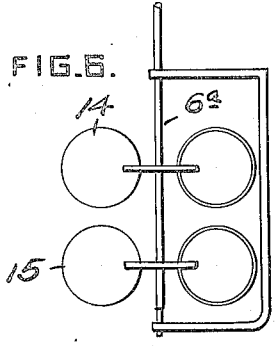
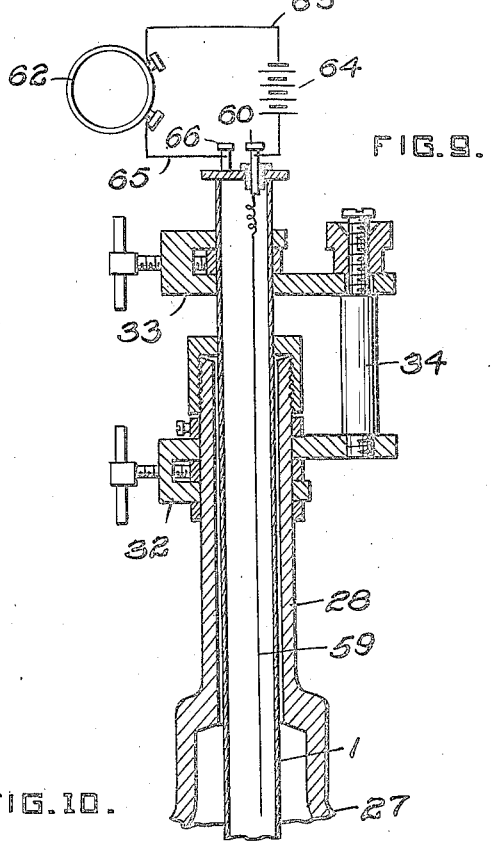
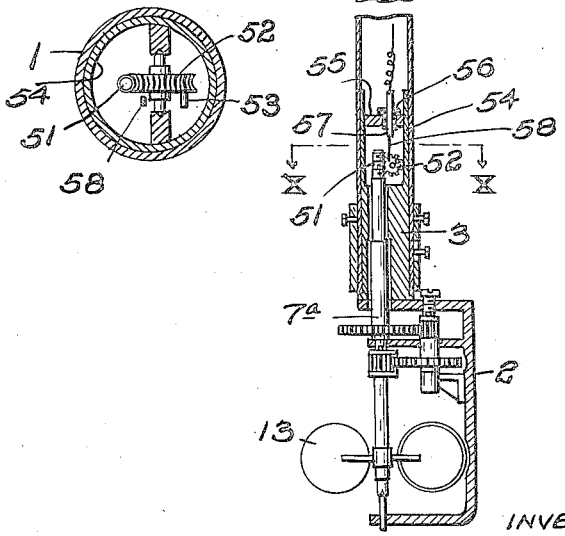

Patented July 20, 1926.

1,593,291

UNITED STATES PATENT OFFICE.

HOWARD T. CRITCHLOW, OF TRENTON, NEW JERSEY.

FLOW METER.

Application filed March 5, 1921. Serial No. 450,072.

The object of my invention is to provide a flow meter which will accurately measure the volume of fluid, either liquid or gas, flowing through a conduit at different velocities, and which may be readily inserted in and removed from the conduit without in any way interrupting the flow.

Figure 2:
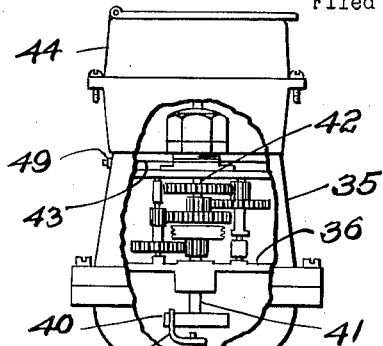
Figure 2:
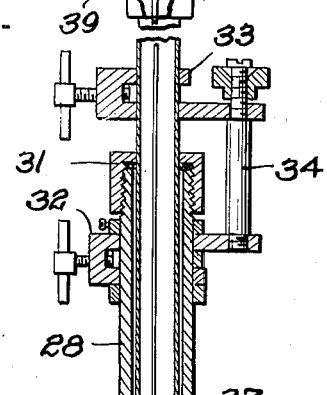
Figure 2:
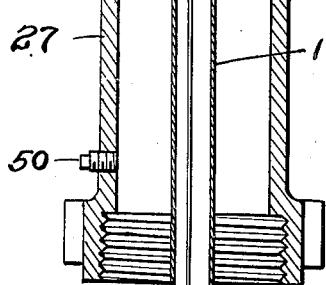
Figure 2:
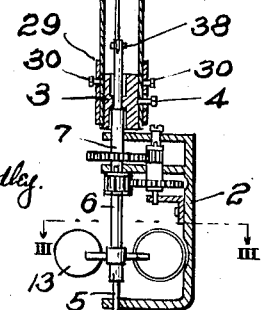
Figure 1:
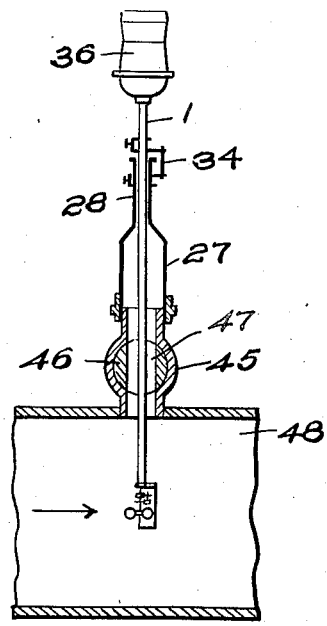
Figure 3:
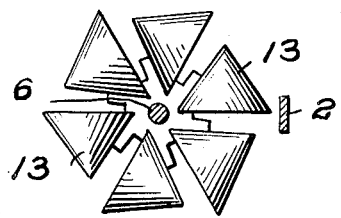
Figure 4:
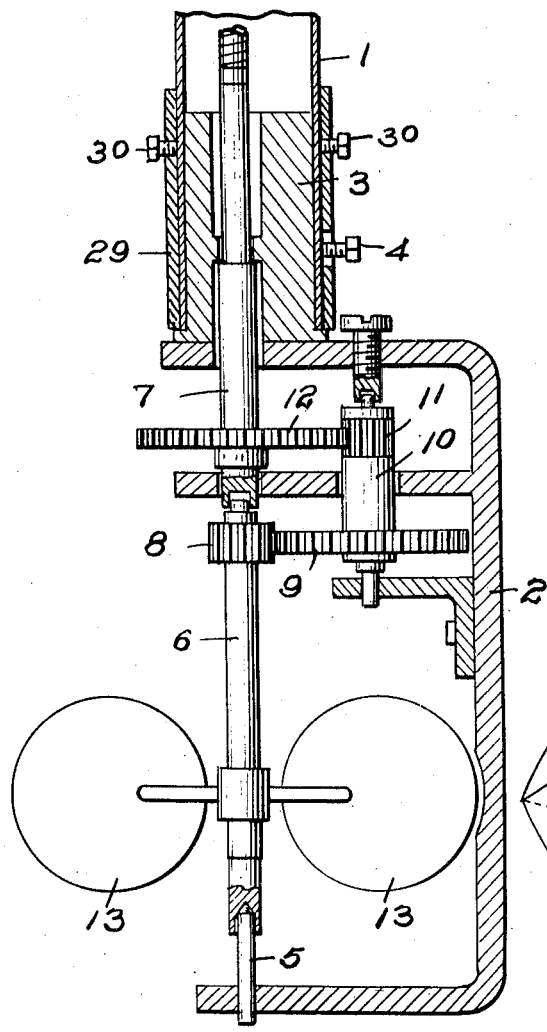
Figure 5:
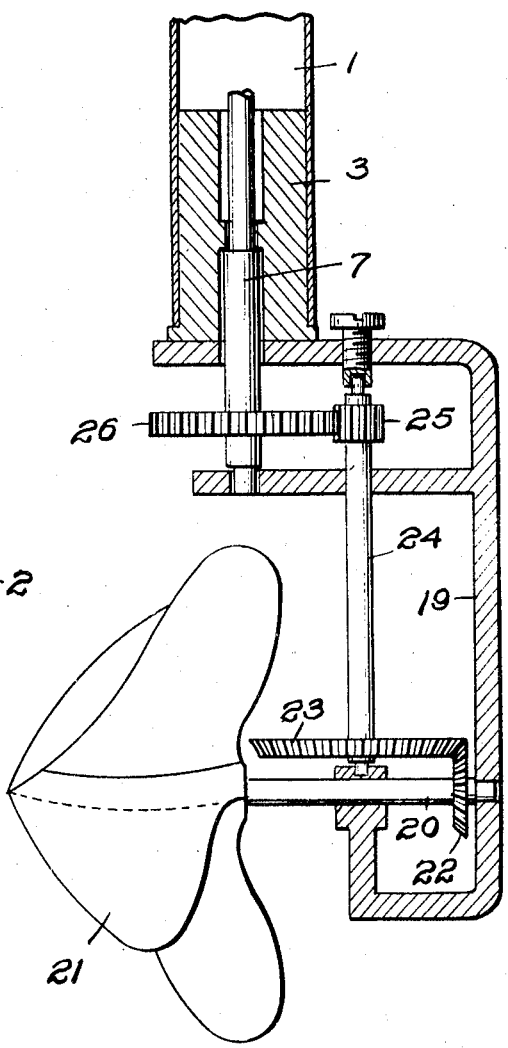

The invention is illustrated in the accompanying sheets of drawings of which Fig. 1 is a vertical central sectional view of a conduit showing the flow meter installed, the meter being illustrated partly in longitudinal section and partly in side elevation; Fig. 2 a combined side and longitudinal central sectional view of the meter shown to larger scale than illustrated in Fig. 1; Fig. 3 a view of the lower end of the meter, the plane of view being indicated by the line III—III Fig. 2; Fig. 4 an enlarged scale central sectional view of the lower end of the meter; Fig. 5 a view similar to Fig. 4 showing a modification of construction; Figs. 6, 7 and 8 a diagrammatic view showing various arrangements of velocity wheels; Fig. 9 a view similar to Fig. 2 showing a modified form of the meter; and Fig. 10 a sectional view taken on the line X—X, Fig. 9.

The meter apparatus which I provide is carried by a tube which may be inserted through an orifice in the wall of a conduit carrying the fluid, the volume of which it is desired to measure. At the inner end of the tube there is a velocity wheel and a reducing gear both of such small dimensions that they occupy but little space in the conduit and may readily be inserted through its orifice. Extending through the tube there are connections leading from the velocity wheel to a registering apparatus whereby the rotations of the velocity wheel become effective to indicate the volume, or a factor of the volume, of the fluid which has passed the plane of the wheel. In one form of the apparatus the rotation of the velocity wheel drives a rotary shaft extending through the tube, and such shaft is connected to a register mounted upon the outer end of the tube. In another form of the apparatus the register is of the electrically operated type and the connections extending through the tube include a suitable electrical conductor. The tube is provided with a conduit attachment member which may take the form of a hood adapted to be attached to a flange surrounding the conduit orifice through which the tube extends. The tube is suitably mounted for longitudinal movement through the hood, and the hood is of such size that the velocity wheel and reducing gear at the lower end of the tube may be drawn within, and protected by, the hood. To hold the meter in proper position when installed in a conduit, means are provided to clamp the tube to the hood in variable positions.

Having reference now to the embodiment of the invention illustrated particularly in Fig. 2, the entire apparatus may be carried by a cylindrical tube 1, the length of which may be varied to suit different conditions of service. The preferred manner of mounting the velocity wheel at the lower end of the tube 1 is illustrated in detail in Fig. 4. A yoke frame 2 is provided with a head 3 adapted to fit neatly within the tube 1 and to be clamped thereto by means of a set screw 4. At the lower end of the frame there is a bearing pin 5 upon which the lower end of a velocity wheel shaft 6 is mounted. The upper end of the shaft 6 is, for the purpose of reducing friction, conveniently mounted in a second rotatable shaft 7 which turns in the same direction as, but at a lower rate of rotation than, the shaft 6. The wheel shaft 6 is provided with a pinion 8, which meshes with a pinion 9 attached to a shaft 10 provided with a small pinion 11, which pinion in turn meshes with a pinion 12 attached to the shaft 7. In a manner presently to be explained, the shaft 7 is attached to the driving shaft which extends through tube 1.

The invention is unlimited to any particular form of velocity wheel. The form shown in Figs. 3 and 4 comprises a plurality of cups 13 mounted upon the shaft 6 so that the plane of the open end of each cup passes through the axis of rotation of the shaft 6. In place of using a single velocity wheel two cup wheels 14 and 15 may be mounted upon the rotary shaft 6$^a$ in the manner diagrammatically illustrated in Fig. 6, the two wheels increasing the driving power of the shaft and being preferably used for measuring fluids flowing at a low velocity. Particularly in the case of measuring fluids flowing at a high velocity, two wheels 14$^a$ and 15$^a$ of different relative sizes and arranged oppositely may be mounted on a shaft 6$^b$, as illustrated in Fig. 7. The smaller velocity wheel 15$^a$ tends to counteract and slow down the rate of rotation of the shaft 6ᵇ driven by the larger velocity wheel 14ᵃ.

To minimize friction, the pivot pin 5 at the lower end of the shaft 6 may be mounted upon the end of a second rotatable shaft provided with a velocity wheel adapted to drive the second shaft in the same direction as the shaft 6. This construction is diagrammatically illustrated in Fig. 8 which shows a shaft 16 provided with a velocity wheel 17 and having at its upper end a bearing pin 5ᵃ upon which the lower end of the shaft 6ᶜ rests. The velocity wheels 17 and 18 (the latter being attached to the shaft 6ᶜ) are arranged to rotate in the same direction.

In place of the velocity wheels of the type particularly shown in Figs. 3 and 4, a propeller-type wheel may be used. This construction is illustrated in Fig. 5 which shows a yoke frame 19 provided with a rotatable shaft 20, the outer end of which is provided with a propeller-type velocity wheel 21, and the inner end with a bevel pinion 22. Meshing with the pinion 22 there is a pinion 23 attached to a shaft 24 provided with a small pinion 25 which meshes with a pinion 26 attached to shaft 7.

The register for indicating the volume of fluid which flows past the velocity wheel is attached to the top of tube 1. It comprises a fluid-tight casing 35 provided with a frame 36 on which a train of reducing gears is mounted in the manner clearly illustrated in Fig. 2. A shaft 37 extends through the tube 1 and is connected at its lower end to the shaft 7. The shaft 7 is eccentric with respect to the tube 1 at its lower end, being on the opposite (and upstream) side of the center of the tube from the vertical portion of the yoke 2, so that the size of the orifice in the conduit may be reduced to a minimum and still allow the velocity wheel and yoke to clear. Therefore, in order to prevent binding, the connection between shafts 37 and 7 is by means of a flexible joint 38. The upper end of shaft 37, which is concentric with the upper end of tube 1, is provided with a laterally extending arm 39 which engages an arm 40 attached to a shaft 41, which, through the train of gears mounted on the frame 36, drives a shaft 42. Arranged above the train of gears in the casing 35, there is a partition 43, a portion of which is formed by a diaphragm of familiar construction through which shaft 42 extends, the passage of the shaft through the diaphragm being fluid-tight so that no fluid may pass above the partition 43. Shaft 42 is connected to a set of change gears and a dial register of familiar construction mounted in a casing 44 secured to the top of casing 35. By proper selection of the ratio of the change gears between the shaft 42 and the dial register, the apparatus may be calibrated to directly indicate the volume of fluid flowing through a conduit of a given diameter, although in some cases it may also be desirable to vary the ratio in the reducing gears at the lower end of tube 1 and the casing 35. If it is desired to use a single instrument for measuring at different times the volume flowing through conduits of different sizes, the reading of the register may be used as a factor in connection with the cross-sectional area of the conduit for computing the volume of fluid that flows through the conduit.

The conduit attachment member or hood for fastening the apparatus to a conduit and for protecting the velocity wheel and reducing gear, may comprise a bell 27, having at its upper end a tubular extension 28, and being screw-threaded at its lower end to engage a flange surrounding an orifice in a conduit. The bell 27 is large enough internally to receive the yoke frame 2 and the velocity wheel or wheels and reducing gear mounted on it. By having the shaft 7 eccentric with respect to the tube 1, as mentioned above, the size of the bell 27 may also be reduced to a minimum. To prevent the yoke 2 and its delicate bearings from becoming injured when tube 1 is drawn upwardly to bring the velocity wheel and reducing gear within the bell 27, a stop collar 29 may be attached by set screws 30 to the lower end of the tube 1, the collar being adapted to strike against the lower end of the tubular portion 28 of the conduit attaching member. When the meter is installed, in a conduit carrying fluid under pressure, fluid from the conduit occupies the space within the bell surrounding the tube 1. For preventing escape of the fluid, the upper end of the tubular extension 28 may be provided with a suitable packing gland 31 through which the tube 1 extends.

In operation, it is desirable to have the velocity wheel at a known position within the conduit, preferably at its center, and to maintain it in such position. For this purpose a clamp is provided for attaching tube 1 to the tubular extension 28 of the bell. The clamp shown herein comprises a pair of yokes 32 and 33, the former engaging the tubular extension 28 and the latter the tube 1. These yokes are attached to each other by means of a rod 34. The face of tube 1 may be graduated to show the precise position of the velocity wheel with relation to the conduit attaching member, and hence its position in the conduit when installed therein.

Before explaining the construction of the modified form of apparatus illustrated in Figs. 9 and 10, the operation of the form of apparatus thus far explained will be described, and in connection with the description of the operation some further structural features will be explained.

To insert the lower end of the flow meter into a conduit without interrupting the flow through the conduit, the conduit may, as illustrated in Fig. 1, be provided with a corporation cock of familiar construction comprising a casing 45 and a rotatable valve 46 provided with a passage-way 47. When it is desired to install the apparatus in a conduit 48, the lower end of bell 27 is screwed upon the upper end of casing 45 of the corporation cock, tube 1 being in its upper position, that is to say, in such position that the velocity wheel and reducing gear at the lower end of the tube lie within bell 27. After this connection to the valve casing has been made, the valve 46 may be turned to the open position indicated in Fig. 1, the clamp 33 loosened, and tube 1 moved downwardly through passage-way 47 of the valve until the velocity wheel is substantially at the center of conduit 48. This may be indicated by the graduations of the outer face of the upper end of tube 1. Clamp 33 may be tightened, then clamp 32 tightened after the velocity wheel has been properly oriented with respect to the flow of the fluid, and the instrument will continue to measure the volume of fluid flowing through the conduit as long as it is in the described position.

When liquid is measured it will flow upwardly through tube 1 to a height depending upon the pressure of the liquid in the conduit. There is a free passage through tube 1 and into casing 35 so that if the pressure is sufficiently high, liquid may rise to the diaphragm 43 in casing 35. Ordinarily, the pressure of a liquid, the volume of which is being measured is sufficient to cause the liquid to rise to the diaphragm 43, and, to prevent the trapping of air in the upper part of casing 35, the casing is provided with a removable plug 49 just below diaphragm 43. By removing this plug, the trapped air may be released so that the entire train of gears in casing 35 may be submerged, thus eliminating any factor of error which might arise from having an undetermined portion of the gear train submerged.

To remove the apparatus from a conduit, the procedure is the reverse of that explained above. The clamp 33 is first released and the tube drawn upwardly until the collar 29 strikes the lower end of the tubular extension 28. The corporation cock may then be closed and bell 27 unscrewed from the valve casing 45. If desired, the liquid within bell 27 as well as within tube 1 and casing 35 may be drained out before detaching the bell 27. This may be done by removing a plug 50 with which the bell is provided, the plug 49 being also removed from casing 35 to permit air to enter above the liquid. With the tube 1 in its upper position clamp 33 may be tightened so that the velocity wheel and the delicately mounted gear train at the end of the tube may be protected by the bell. To afford further protection, a suitable plug may be screwed into the lower end of the bell.

The apparatus of Figs. 9 and 10 differs from that shown in Figs. 2–8 in that the former is provided with an electrically operated register and with suitable mechanism to convert the rotations of the velocity wheel into an interrupted electric current for operating the register. The apparatus of Figs. 9 and 10 includes a tube 1, a yoke 2 and its velocity wheel and reduction gear, a conduit connecting-member 27, 28, and a clamp 32, 33, 34 the same as shown in the apparatus of Figs. 2–8. Shaft 7$^a$, instead of being connected to a rotary shaft extending through the tube 1, is provided at its upper end with a worm 51 which drives a worm wheel 52 provided with a contact pin 53. Wheel 52 is mounted within a contact box 54, between the outer wall of which and the inner wall of tube 1 fluid may not flow upwardly into tube 1. The upper end of the contact box is closed by a transverse partition 55 provided with an insulating bushing 56 through which there extends a conductor 57. The lower end of conductor 57 is provided with a spring contact finger 58 lying in the path of, and adapted to be intermittently contacted by, the pin 53 of worm wheel 52. The upper end of conductor 57 is attached to an insulated conductor 59 which extends upwardly through tube 1 and is connected to a binding post 60 mounted in an insulating plug 61 at the top of the tube. A suitable electric contact register 62 of familiar construction is electrically connected to the binding post 60 by a conductor 63, which conductor may include a source of current supply such as a battery 64, and a conductor 65, which in turn leads from register 62 to a binding post 66 which is electrically connected to tube 1.

In operation, the velocity wheel rotates shaft 7$^a$ and thereby causes pin 53 of worm wheel 52 to intermittently contact with the spring contactor 58. Each time a contact is made a circuit is closed through the contact register 62, the circuit between the spring contactor 58 and conductor 65, may be completed through worm wheel 52 and its mounting, contact box 54, tube 1 and binding post 66. Ordinarily, sufficient air is trapped in contact box 54 to prevent liquid from rising in it and completing the circuit between spring contactor 58 and shaft 7$^a$, or worm wheel 52. In case the liquid being measured is under high pressure, and such liquid is a conductor of electricity, oil or other non-conductor of electricity may be placed in contact box 54.

The electric contact register may be placed on top of tube 1 or at any convenient position remote therefrom. The electrical instrument is advantageous when it is desired to read the volume at a distance from the point of its measurement, and it is also advantageous in the measuring of fluids flowing at very low velocities because the velocity wheel is called upon to do less work than in the other form of apparatus.

The advantages of the flow meter which I have provided are readily apparent to those familiar with the problem of measuring the volume of fluids flowing through a conduit. The apparatus may be used for measuring the flow of gaseous fluids as well as liquids, although it is primarily intended for measuring the volume of flowing liquids such as water and oil. The apparatus may be readily installed in a conduit without interrupting the flow through the conduit, and when installed it measures the total volume of flow past the plane of the instrument without the use of any auxiliary driving attachment. When the apparatus is not in use, as well as when it is being installed in a conduit, its delicate parts are adequately protected against injury. By providing a reducing gear at the lower end of tube 1, the shaft 37 may be made light in weight, and it together with the shaft 7, may be supported by yoke 2, thereby relieving bearing pin 5 of excessive weight which would materially increase the friction of the velocity wheel shaft. Other advantages which might be enumerated are readily apparent to those skilled in the art.

According to the provisions of the patent statutes, I have described the principle and operation of my invention together with several embodiments thereof and modifications of structural elements. However, I desire to have it understood that, within the scope of the appended claims, the invention may be practiced by other forms of construction than those specifically shown and described.

I claim as my invention:

1. A flow meter insertable in and removable from a closed conduit, comprising a conduit-attachment member, a tube longitudinally movable through said member, a velocity wheel attached to the lower end of the tube, a register, connections extending through said tube from the velocity wheel to the register, a clamping member attachable at variable positions to the upper end of said tube and adapted to remain attached to the tube when the tube is in withdrawn position, and separate means for attaching said clamping member to the conduit-attachment member after the clamping member has been attached to the tube.

2. A flow meter insertable in and removable from a closed conduit, comprising a conduit-attachment member, a tube provided at its lower end with a velocity wheel and longitudinally movable through said member, a register, connections extending through said tube from the velocity wheel to the register, a clamping member attachable at variable positions to the upper end of the tube, a second clamping member connected to the conduit-attachment member, and means for connecting said two clamping members to each other in fixed relative positions.

3. A flow meter insertable in and removable from a closed conduit, comprising a conduit-attaching member having a threaded end for engaging a conduit, a tube longitudinally movable through said member, a frame attached to the lower end and a register to the upper end of the tube and each movable with the tube, a vertically disposed shaft rotatably mounted in said frame, a velocity wheel mounted in said frame and connected to said shaft for driving it, a reducing gear connected to said shaft, and a connection extending through said tube between said reducing gear and register to cause the latter to operate in response to the rotation of the velocity wheel.

4. A flow meter insertable in and removable from a closed conduit, comprising a conduit-attaching member having a threaded end for engaging a conduit, a tube longitudinally movable through said member, a frame attached to the lower end of the tube, a short vertically disposed shaft rotatably mounted in said frame, a velocity wheel connected to said shaft for driving it, a long shaft extending through said tube, a reducing gear connection between said short and said long shafts, and a register attached to the upper end of the tube and connected to the upper end of said long shaft and movable with said tube.

5. A flow meter for measuring the volume of a fluid flowing under pressure through a conduit, comprising a conduit-attaching member having a threaded end for engaging a conduit, a tube longitudinally movable through said member, a frame attached to the lower end of the tube, a velocity wheel and connected reducing gear mounted on the frame, a rotatable shaft connected to the reducing gear and extending through the tube, a casing attached to the upper end of the tube and movable therewith, a reducing gear within said casing, and a register connected to said last named reducing gear, said tube placing said casing and its contained reducing gear in free communication with the fluid in the conduit.

6. A flow meter insertable in and removable from a closed conduit, comprising a tube, a frame attached to the lower end of the tube, a vertically-disposed shaft rotatably mounted in said frame, a velocity wheel connected directly to said shaft for driving it, a long shaft extending through said tube, a reducing gear connection between said short and said long shafts, a register attached to the upper end of the tube and connected to the upper end of said long shaft, and an elongate conduit-attachment hood surrounding said tube and slidable thereon to a position in which it surrounds and affords protection for said frame and the parts carried thereby at the lower end of the tube when the meter is detached from a conduit.

In testimony whereof, I have hereunto set my hand.

HOWARD T. CRITCHLOW.